May 27, 1930.  R. STOVER  1,759,964
APPARATUS AND METHOD FOR MAINTAINING CHOCOLATE IN MELTED CONDITION
Filed May 3, 1926  2 Sheets-Sheet 1

INVENTOR.
Russell Stover,
BY Thomas E. Scofield
ATTORNEY.

Witness:
R. E. Hamilton

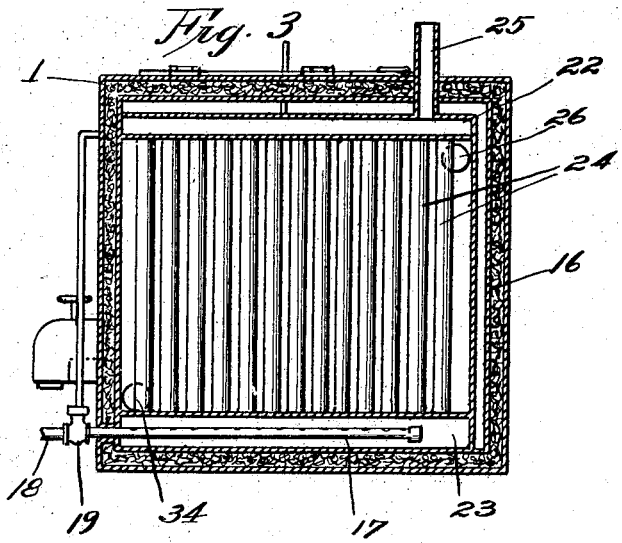
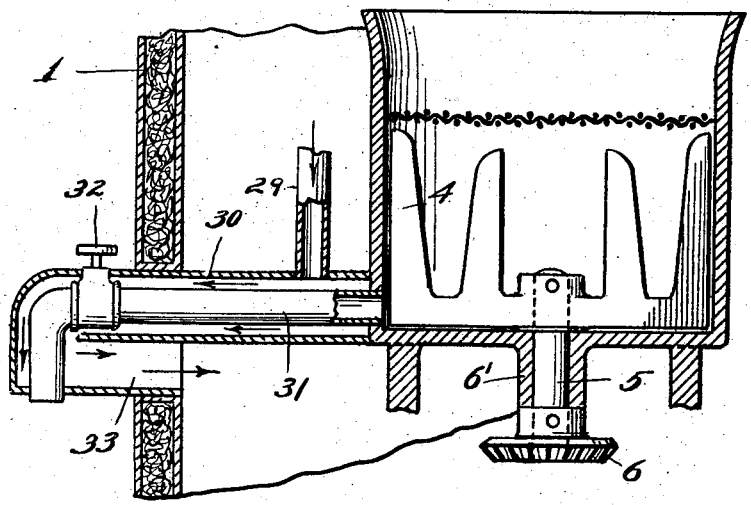

Patented May 27, 1930

1,759,964

UNITED STATES PATENT OFFICE

RUSSELL STOVER, OF DENVER, COLORADO

APPARATUS AND METHOD FOR MAINTAINING CHOCOLATE IN MELTED CONDITION

Application filed May 3, 1926. Serial No. 106,428.

This invention relates to improvements in constant temperature heating kettles and refers particularly to confectioners' kettles wherein it is of importance to maintain a relatively constant temperature at all times.

The invention is particularly adapted to the melting of chocolate for use in liquid or semi-liquid form for coating candy, such coating chocolate being manufactured in the form of bars which must be melted at a predetermined temperature,—this temperature being difficult to maintain throughout the mass of chocolate and especially when it is constantly being drawn off and replenished. Furthermore, if the chocolate is overheated, it is spoiled for use in candy making. It has hitherto been expensive to melt chocolate because the human element involved in maintaining proper temperature conditions requiring that the mixture be constantly watched and a careful control maintained.

Among the important objects of the invention are to provide a construction in which the ingredients or mix contained in the kettles is maintained at a relatively constant temperature by supplying thereto a heating medium such as air at a temperature automatically controlled within a relatively narrow range. A constant circulation of warm air is maintained through a cabinet with heat insulated walls, the stirring kettle or kettles being within the insulated cabinet.

Another problem in connection with the melting of chocolate in candy factories arises from the fact that as the melted chocolate is withdrawn from the kettle the supply must be replenished and when the bars of chocolate are dropped into the kettles they cool the mass, seriously affecting its consistency and adaptability for candymaking. A considerable time elapses before the chocolate bar or bars can be melted and brought to the temperature of the material in the kettle. It is my purpose to provide a fresh supply of chocolate at all times at a proper temperature and to keep the stock in the kettle sufficient without creating objectionable variations in temperature. This replenishing stock is furnished to the kettle in melted form at a proper temperature which will not affect the molten condition or the temperature of the melted chocolate in the kettle. Further objects of the invention lie in the details of the construction particularly the grids or gratings supported within the kettles for supporting materials or ingredients which are to be melted down into the kettle and to provide a construction in which the draw-off lines from the kettles are maintained at a temperature sufficiently high to keep the mix or substance contained in the kettles and drawn off through the withdrawal lines in a relatively liquid condition, and in general to provide a construction hereinafter described in more detail.

Fig. 3 is a sectional view taken along the line 3—3 in Fig. 1, and

Fig. 4 is an enlarged detailed view showing the method of heating the draw-off lines.

Figure 1:
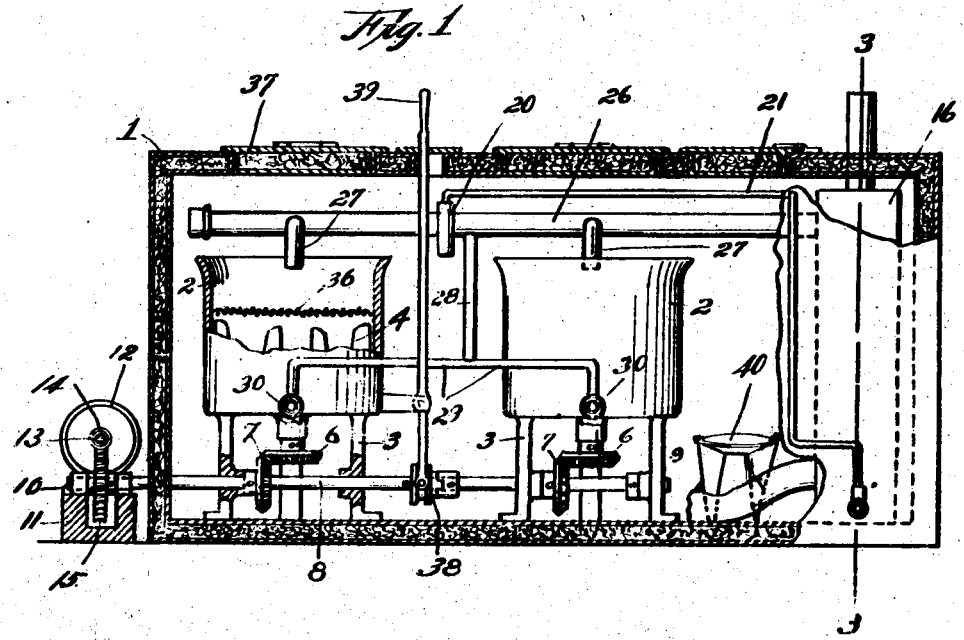
Fig. 1 is a sectional side view of the apparatus with parts broken away.
Figure 2:
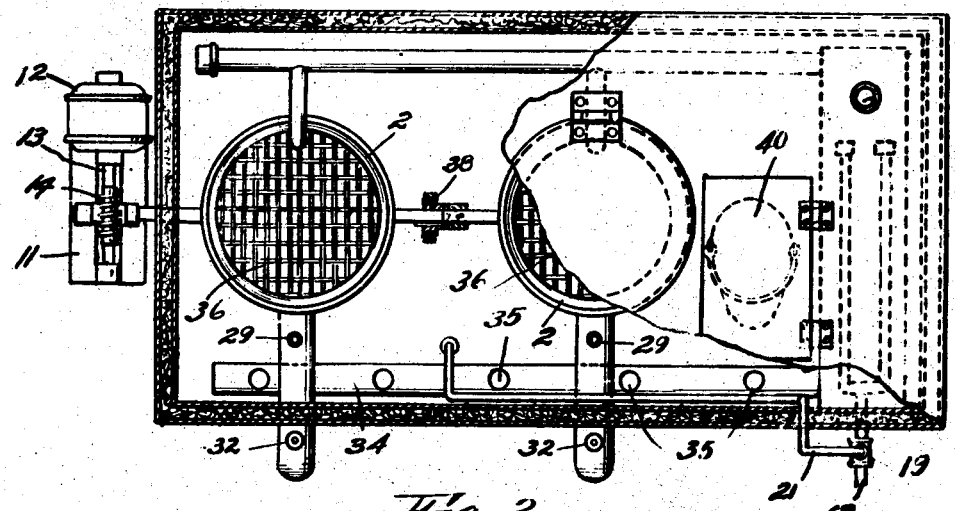
Fig. 2 is a sectional view of the construction shown in Fig. 1, with parts in plan view.

Referring to the drawings, within an enlarged insulated casing 1 are positioned kettles 2, the latter being supported on standards or frames 3. The drawings show but two of these kettles mounted within the casing but it is understood that any desired number may be included within a single casing and proper provision made for driving the agitators 4 positioned within the kettles. These agitators are mounted upon vertical shafts designated as 5 in Fig. 4, which are supported in vertical bearings 6', positioned centrally and below the respective kettles. At the lower extremities of the shafts 5 are mounted the bevelled gears 6, meshing with bevelled gears 7, mounted upon the lower horizontal shaft 8. This lower shaft is supported in suitable bearings 9 mounted upon the standards 3 and bearings 10 on a block 11 supporting a motor or source of power, designated as 12. In order to transmit the power from the power source 12 to the shaft 8 on the motor shaft 13 is mounted a worm 14 meshing with a worm wheel 15 which is carried on the shaft 8.

At one end of the insulated casing or cabinet is positioned a heating source which consists of a stove 16. In the bottom of this stove is a gas burner 17 receiving its gas supply through a main 18. In the gas supply line is a valve 19 automatically controlled by means of a thermostat diagrammatically shown at 20. This thermostat is positioned within the insulated casing 1 and has electric connections 21 with the valve 19 for controlling the gas supply to the burner, according to the temperature set on the thermostat. The stove has an upper header 22 and a lower header 23 connected by tubes 24. The gases of combustion which supply heat to the stove and are generated in the lower header 23 pass up through the tubes 24 into the header 22, the fumes passing off through the chimney 25 while the heated air circulated about the tubes 24 is withdrawn through the duct 26 which runs longitudinally of the insulated casing 1. Connections 27 lead off from the duct 26 and terminate as open ended pipes in the heating kettles. Thus, the air heated in the stove passes through the duct 16 and is discharged onto the substance contained in the kettles where it serves to melt the mix to a fluid condition. A secondary pipe 28 is connected into the duct 26 which through pipes 29 supplies the heated air to annular spaces 30 surrounding the draw-off lines 31 from the kettles. These draw-off lines are controlled by suitable valves 32, usually of the gate type. The heated air supplied to the annular space 30 surrounding the draw-off lines is returned through the openings 33 into the casing 1 where the cooled air is drawn into a return pipe 34 through the apertures 35. This air is then delivered back to the stove for reheating.

Supported in the kettles are gratings or grids 36, instead of a grating, heavy wire screening may be used. The function of these gratings is to support ingredients to be melted into the kettle, such as chocolate. Heretofore it has been the usual practice to break up the bars of chocolate and place them in the kettles, a practice which is not only wasteful, but disagreeable, and time consuming. When broken bars of chocolate are dropped directly into the kettles, the temperature of the whole mass is lowered and since the temperature must be kept within a very narrow range to keep the material at the desired temperature for candymaking, this lowering of the temperature renders the chocolate in the kettle unusable for a substantial time. If the chocolate cakes or bars are placed upon the grids, the heat readily melts the chocolate into the kettle at the temperatures maintained. By my method as above explained, the fresh supply of chocolate is furnished to the molten chocolate in the kettle properly melted and at a temperature such as not to affect the chocolate in the kettle nor to interfere with its constant availability for use.

The construction further eliminates the necessity of having expensive jacketed kettles, which are difficult, without constant attention, to maintain at constant temperatures.

Furthermore, with little expense, the heat of the kettles can be continuously kept at constant temperature, eliminating the usual overnight freezing of chocolate, or other mixtures in the kettles. Where methods formerly known are employed, it is the practice to let the chocolate in the kettles harden at night. The other alternative has been to keep an attendant over the kettles to maintain the proper temperatures. Since the melting of chocolate has heretofore been such a slow process, it has been necessary to have one man commence the remelting process several hours before the time for dipping or other use of the melted chocolate. This expense is avoided by my device and method whereby the chocolate can easily be maintained at a proper temperature and in a melted condition without constant attention. In the top of the casing or cabinet and above the respective kettles are covers 37 in the tops of which are inserted plates of glass, so that the mechanism can be viewed without opening the cabinet.

At 38 is diagrammatically shown a clutch arrangement for connecting or disconnecting the drive to one of the kettles. This clutch is manipulated by a handle 39.

Space in the cabinet is adequate for placing therein buckets or scuttles, such as shown at 40. The materials being heated in the kettles are drawn off into the receptacles of this character to be transported about the factory, or shop, and it is a decided advantage to have facilities for keeping this material in the liquid condition.

Furthermore, by maintaining a constant temperature upon chocolate or other types of confectioners' mixes considerable time is saved in having the ingredients at just the proper temperature for dipping or molding the materials.

This type of construction is a great economizer of heat and permits the use of much more inexpensive equipment than is now being utilized in the manufacture of confections. The construction obviates the use of heavy jacketed kettles and the necessity for the circulation of steam or hot water through the kettles and eliminates the continual attention necessitated by the apparatus now in common usage.

Overcoming difficulties heretofore encountered in connection with freezing of the draw-off lines and valves is also an important novelty in the present apparatus.

I claim as my invention:

1. A heating apparatus of the character described, comprising in combination, an insulated case, heating kettles with valve controlled draw-off lines in the case, a source of heat, a hot air duct connected therewith, leads from the duct terminating within the upper part of the kettles, secondary leads from the ducts adapted to circulate the heating medium about the draw-off lines and valves, and a return duct for delivering the spent heating medium back to the heat source.

2. A heating apparatus of the character described, comprising in combination, an insulated case, heating kettles in the case, melting grids in the kettles, a source of heat, a hot air duct connected thereto with leads terminating in the upper portion of the kettles and adapted to direct heating fluid downwardly into operative contact with the grids, and a return duct for delivering the spent heating medium back to the heating source.

3. A heating apparatus of the character described, comprising in combination, an insulated case, heating kettles in the case, agitators in the kettles rotated by vertical shafts driven from below, a source of heat, a hot air duct connected therewith with leads terminating in the upper portions of the kettles, and a return duct for delivering the spent heating medium back to the heating source.

4. The process of melting fusible materials which are easily damaged by heat, comprising impinging hot air thereon while supported out of contact with a molten mass of the same material maintained at a predetermined temperature, and allowing the material as it melts to drop into the molten mass, the whole being maintained at the said predetermined temperature.

5. The process of melting chocolate, comprising impinging hot air thereon while supported out of contact with a molten mass of chocolate maintained at a predetermined temperature, and allowing the chocolate as it melts to drop into the molten mass, the whole being maintained at a substantially uniform predetermined temperature.

RUSSELL STOVER.